US007721909B2

(12) United States Patent
Beeren et al.

(10) Patent No.: US 7,721,909 B2
(45) Date of Patent: May 25, 2010

(54) TANK

(75) Inventors: Joseph M. H. Beeren, Horst (NL); Willy Peeters, Overloon (NL)

(73) Assignee: John Deere Fabriek Horst B. V., Horst (NL)

( * ) Notice: Subject to any disclaimer, the term of this patent is extended or adjusted under 35 U.S.C. 154(b) by 1290 days.

(21) Appl. No.: 11/224,572

(22) Filed: Sep. 12, 2005

(65) Prior Publication Data
US 2006/0054239 A1 Mar. 16, 2006

(30) Foreign Application Priority Data
Sep. 15, 2004 (DE) .................. 10 2004 045 078

(51) Int. Cl.
B65D 1/24 (2006.01)
B65D 1/36 (2006.01)
B65D 85/00 (2006.01)

(52) U.S. Cl. ............... 220/503; 220/4.12; 220/86.1; 220/254.3

(58) Field of Classification Search ............. 220/4.12, 220/254.1, 254.3, 293, 505, 503, 521, 525, 220/526, 562–564, 4.13, 582, 86.1, 86.2, 220/565; 141/309
See application file for complete search history.

(56) References Cited

U.S. PATENT DOCUMENTS

| 1,192,134 | A | * | 7/1916 | Stevens | ............... | 73/306 |
| 1,430,840 | A | | 10/1922 | Ostler | | |
| 2,294,176 | A | * | 8/1942 | Gredell | ............... | 220/86.1 |
| 3,782,695 | A | | 1/1974 | Sandiford | ............... | 259/4 |
| 4,315,579 | A | | 2/1982 | Martin, Jr. | ............... | 220/371 |
| 5,085,257 | A | * | 2/1992 | Smith | ............... | 141/86 |
| 2002/0185180 | A1 | | 12/2002 | Smith et al. | ............... | 137/565.17 |

FOREIGN PATENT DOCUMENTS

| CH | 245 876 | 8/1947 | |
| DE | 22 40 351 | 2/1974 | .............. 87/40 |
| DE | 87 05 113 | 7/1987 | .............. 90/54 |
| DE | 37 00130 | 7/1988 | .............. 90/62 |
| DE | 39 21 089 A1 | 6/1989 | |
| DE | 298 04 894 | 7/1998 | .............. 90/10 |
| EP | 10 97 637 A1 | 2/1999 | |
| GB | 23 76 451 A | 7/2002 | |
| WO | 2004/0 98 265 A2 | 11/2004 | |

* cited by examiner

Primary Examiner—Anthony Stashick
Assistant Examiner—Harry A Grosso

(57) ABSTRACT

A tank for an agricultural field sprayer having a fill region and a first closure. To avoid costly connections for lines at the tank and to reduce the cost of manufacture of the tank, the first closure can be rigidly connected to the tank and provided with an opening uncovered by a second closure. The connections of the first closure are arranged on a region configured as a connecting region, so that an access to the fill region is made possible by the second closure, even if the sprayer is in operation, particularly in a washing-in operation or in a circulating operation.

7 Claims, 5 Drawing Sheets

TANK

FIELD OF THE INVENTION

The invention concerns a tank for an agricultural field sprayer with a filling region arranged on the tank and a first closure developed on the tank that closes off the filling region.

BACKGROUND OF THE INVENTION

Tanks are known in the state of the art, such as tanks for agricultural sprayers, particularly field sprayers, that are provided with a filling region engaged with an opening through which the tank can be filled with various materials to be sprayed including granular material or powder chemicals. Generally, the opening is provided with a closure or a cover, such as a folding cover, that must be opened by an operator. Usually the filling region is supplied with a filler line conducting a carrier fluid such as water into the tank to wash-in the material to be sprayed into the tank. Moreover, a return line or washing-out line or the like may also be provided. In order to avoid costly connections for the lines to the tank, the usual practice is to provide the connections directly on the cover.

A tank of this type is disclosed by DE 39 21 089 A. An agricultural field sprayer is described having an inlet opening equipped with a cover. To simplify fill line connections and a return line, the invention proposes that the connections be provided on the cover. The disadvantage of such an arrangement is that, for the filling process at the fill opening, an opening of the cover is possible only when the fill line and the return line are closed, or the lines are removed from the cover. In order to fill or refill with the material to be sprayed, for example, a circuit of the material to be sprayed must be interrupted for the filling process. Observation of the process of washing-in the material to be sprayed into the sprayer or of washing-out the material out of the tank through the fill opening is not possible.

SUMMARY OF THE INVENTION

It is therefore an object of the invention to define a tank of the aforementioned type that is provided with a closure that overcomes one or more of the aforementioned problems.

The task is solved according to the invention by the teaching of a tank for an agricultural field sprayer including a fill region located on the tank and a first closure closing the fill region, wherein the first closure includes an opening having a second closure. Further advantageous developments and further embodiments of the invention follow from the claims.

According to the invention, a tank of the type described above is provided with a first closure that is provided with a opening equipped with a second closure.

The first closure may be configured as a plate or a hood, where a box-shaped as well as an arch-shaped of the hood could be considered. The closure covers the fill region of the tank and thereby provides a cover that closes and seals the tank. The second closure covers an opening that represents an access to the fill region of the tank and is used as a fill opening for fluid or material to be sprayed such as, for example, plant-protective or insecticide material in the form of fluid, granular material or powder.

The first closure includes at least one connection to which a line can be attached for the conveying of fluid that can be accommodated in the tank or with which the tank can be filled. Several connections may be provided, each of which is connected with a line or are connected as a group so that fluid can be conveyed simultaneously or in a timed succession for the filling, returning, spraying, washing-out, washing-in, etc. and is conducted through the connections into the fill region. The second closure can be opened independently of the status of the operation of a line or independently of a conveying process in a line, a second closure can be opened, so that an access to the fill region is assured, for example, to refill material to be sprayed or for the control of a washing-in or washing-out process. In particular, a circulation process, which for example maintains the fluid within a spraying system in a constant circulation in order to avoid deposits, must not be opened when the second closure is opened. There is a particular advantage in the fact that the manufacture of connections can be performed in a considerably simpler and more cost effective manner at the closure than at the tank. The arrangement of connections at the tank can be completely omitted, and various combinations of connections can be realized with the modular configuration of the closure and tank. Therefore, various spray system configurations can be attained in a cost effective manner.

The first partial region is accessible from the opening and is preferably used for filling-or washing-in spray material into the tank. The second partial region is shielded from the opening and from the first partial region for conveying of fluid into the second partial region simultaneously with the filling-and washing-in process without the first partial region being affected thereby. For example, material to be sprayed can be topped off while the circulation arrangement is operated without the danger of an operator coming into contact with splashing or churned up fluid from the second partial region. Moreover, a washing-in process of material to be sprayed or washing-out or cleaning process for the tank can be observed and controlled from the opening developed from the first closure without danger to the operator. Furthermore, it is possible to equip the fill region with further partial regions so that various partial regions are provided for various processes.

A separating wall can be inserted into the fill region to shield the existing partial regions from each other so that no fluid can reach from the one partial region into the other. The separating wall may, for example, be configured as a bridge that extends into the interior of the tank transverse to the fill region and perpendicular to the first closure and is arranged to the side of the opening provided in the first closure. In another embodiment the separating wall may be configured as a cylinder or a funnel extending vertically to the first closure into the tank and enclosing the opening.

In a further embodiment, the first and/or the second partial region are configured as basins so that fluid flowing into one partial region is at first captured and then can flow off into the tank after settling. Moreover, a basin configured here represents an affective shield or a most complete separation from an adjoining partial region of the fill region. A partial region, configured as a basin, may be connected firmly or removable with the tank or the first closure. For example, a partial region may be connected with the tank or with the first closure by adhesive, by welding or by threads. It is also conceivable that the first partial region be connected to the tank or to the first closure as a casting, such as an injection molding or as a formed component such as a deep drawn part. Materials may be used for the tank or the closure such as plastic or metal or other materials that may be cast or formed.

A partial region can also be configured as an insert element, for example, in the form of a pre-manufactured basin, that can be inserted into the fill region. For this purpose the basin may be configured, for example, with a projecting rim that is brought into contact with the opening provided in the first closure. A closure may be folded onto an insert element provided for the first closure so that the rim of the insert element is clamped or otherwise fixed between the first closure and the tank. The insert elements may be configured in various forms and variations, so that, for example, several insert elements can be inserted into the fill region in order to form several differing partial regions that are configured with various volumes or forms. The configuration of such insert elements for the variable configuration of partial regions of a fill region can here also be seen as an independent invention.

A partial region is preferably equipped with a sieve or filter. The sieve or filter may be used, for example, to filter fluid flowing through the partial region so that no contaminants can reach the spray system. Other uses include, for example, deposit of spray material in granular or powder form for uniform distribution into the carrier fluid during the washing-in process. The outflow openings of the partial regions may, accordingly, be configured in various size openings as required, in order to accommodate corresponding sieves or filters. In this way an outflow opening in the first partial region may be considerably larger than an outflow opening in the second partial region, since a relatively large sieve is necessary for the deposit and washing-in of the material to be sprayed.

The connections for lines of the spray system provided at the first closure preferably lead into one of the partial regions. Some of the connections can lead into one partial region, while others can lead into another partial region. It is also conceivable that some connections lead directly into the tank underneath the first closure and that the partial regions are circumvented by lines. In that way, for example, by a corresponding configuration of the partial regions and the connections, a connection can lead into the first partial region to permit filling of carrier fluid during the washing-in process. A further connection can lead into the second partial region that is used for filling another fluid or for the return of fluid to be sprayed. Again another connection can lead between the partial regions directly into the tank, for example, in case the returned fluid is to flow into the tank without filtration or settling.

The first closure may be connected by a connection with the tank that can be removed, for example, by a screw thread or a press fit. This has the advantage that one and the same first closure can be applied, for example, to tanks of various sizes. In the case of the use of insert elements that are clamped or fixed between the first closure and the tank, these may, for example, be exchanged or replaced so that several variations of partial regions are possible with a single spray system.

The first and/or the second closure may be configured in a multiplicity of ways. For example, it may be configured as a bayonet closure that engages a correspondingly configured edge of an opening arranged correspondingly on the tank or on the first closure. Moreover, it is also possible to use a tension closure with clamp clips or to equip the opening with a corresponding threaded connection. The closure may also be configured as a cap and inverted over a projecting rim with a corresponding fit. Furthermore, it is also conceivable that the closure be configured as a slide, that provides an opening by sliding in a corresponding guide. Moreover, the closure may also be configured as a simple cover with or without a folding hinge that may be secured, for example, by a folding safety device such as a locking bar, a press fit, a clamp clip, a clamping ring, a threaded connection, a plug, a safety pin etc. The shape of the closure may also be configured in a multiplicity of ways. Preferably the closure is circular or round, but configurations in a multi-sided shape or an oval form are also conceivable.

A circular or round configuration of the fill region and the first closure has the advantage that it can be arranged in various ways, particularly with regard to the manufacture of the closure with respect to a locking mechanism, for example, a bayonet closure or a threaded connection. In the case of folding covers or tension covers or caps, however, multi-sided or oval shapes may provide an advantage. By arranging the opening eccentrically in the first closure a widening ring-shaped region is created to the side of the first closure in which the connections can be arranged to great advantage.

Preferably the connections are distributed over a partial region of the circumference about the opening provided. Thereby the size of the opening of the first closure can be limited to great advantage. It is also possible to arrange an accumulation of connections about a region that does not extend about a partial circumference, for example, in case several partial regions are provided and only a very limited region of the ring-shaped partial region covers a corresponding partial region of the fill region.

The connections provided at the first closure are connected to lines that include at least one return line and/or washing-in line and/or fill line and/or spray line of a spray system. Here several equal lines may be provided that are connected with one or more connections. However, provision can also be made that each connection is connected with only one type of line.

A tank of the type described above, according to the invention, can also be advantageously combined with a multitude of spraying systems. In particular such a tank is appropriate for agricultural field sprayers such as, for example, attached sprayers or coupled sprayers for agricultural sprayers or self-propelled sprayers.

The drawing shows an embodiment of the invention on the basis of which the invention as well as further advantages and advantageous further developments and embodiments of the invention shall be explained and described in greater detail in the following.

DESCRIPTION OF THE PREFERRED EMBODIMENT

Figure 1:
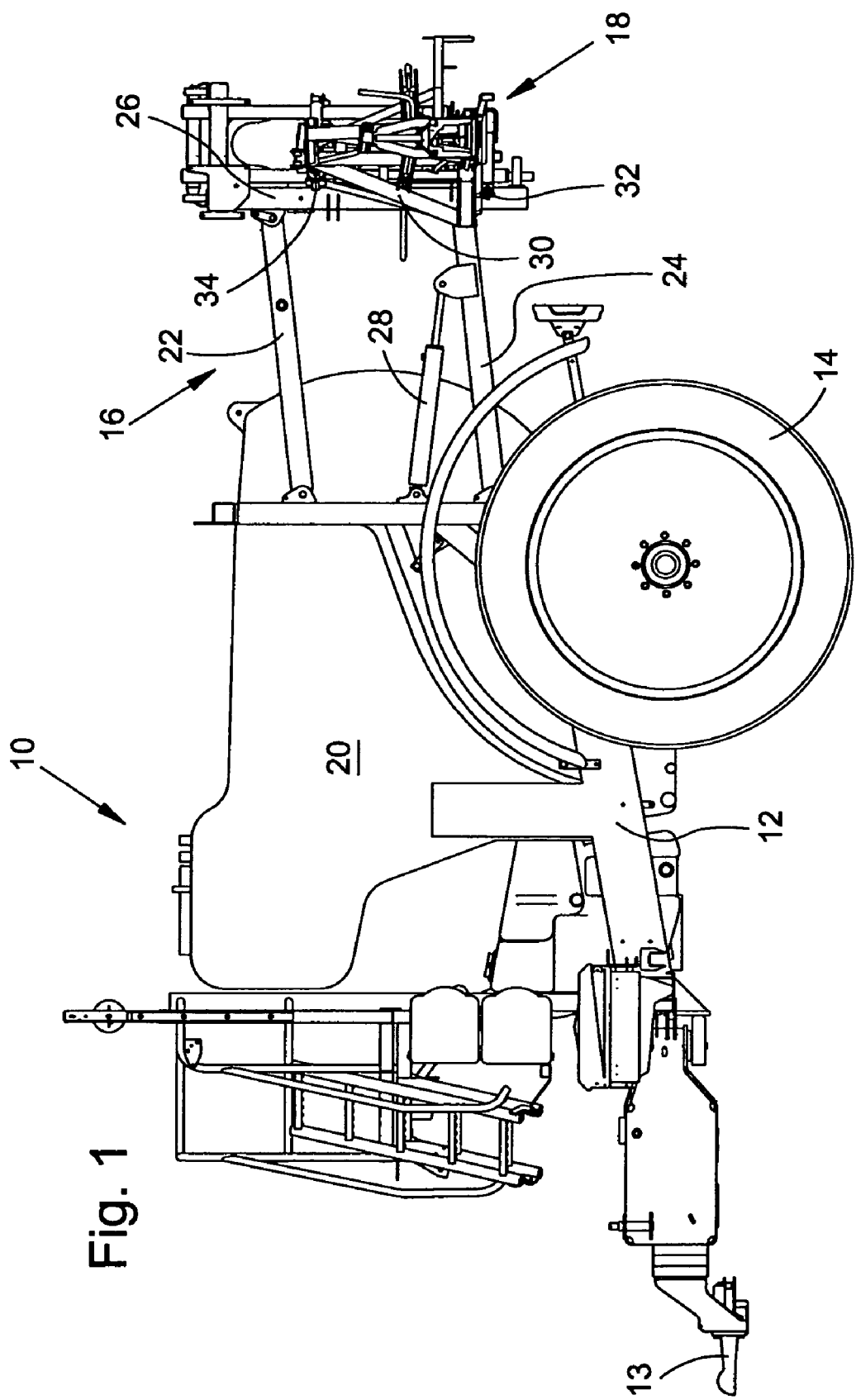
FIG. 1 shows a schematic side view of an agricultural field sprayer with a tank according to the invention.

FIG. 1 shows an agricultural field sprayer 10 in the form of a coupled sprayer for an agricultural tractor (not shown).

The field sprayer 10 includes a frame 12 with a hitch or coupling arrangement 13 and wheels 14, a parallelogram linkage 16, an application arrangement 18, and a tank 20.

The parallelogram linkage 16 is pivotally connected the frame 12 and is provided with an upper arm 22 and a lower steering arm 24 that are guided parallel to each other and extend between the frame 12 and a parallel guided linkage frame 26. A repositioning mechanism in the form of a stepper motor 28 is connected in joints, free to pivot, it extends between the upper steering arm 22 and the frame 12, the stepper motor is configured as a hydraulic cylinder and is used to raise and lower the parallel guided linkage frame 26.

The application arrangement 18 is provided with a boom or spray linkage 30 with application units 32 that include spray nozzles arranged along the spray linkage 30. Moreover the spray linkage 30 is provided with connecting struts 34, that are connected with the linkage frame 26, free to pivot, by means of pivot bearings (not shown). The pivot bearings are arranged in such a way that the connecting struts 34 and with them the spray linkage 30 pivot about an axis that is vertical to the surface of the ground. Due to the pivot bearings, the spray linkage 30 can be brought into an operating condition and a transport position manually or by means of a stepper motor, not shown. The spray linkage 30, shown in FIG. 1, is in its operating position and extends lengthwise transverse to the direction of operation and generally parallel to the surface of the ground. The application units 32 are supplied with fluid to be sprayed over several lines (not shown) extending the lines between the tank 20 and the application arrangement 18 as well as along the spray linkage 30.

Figure 2:
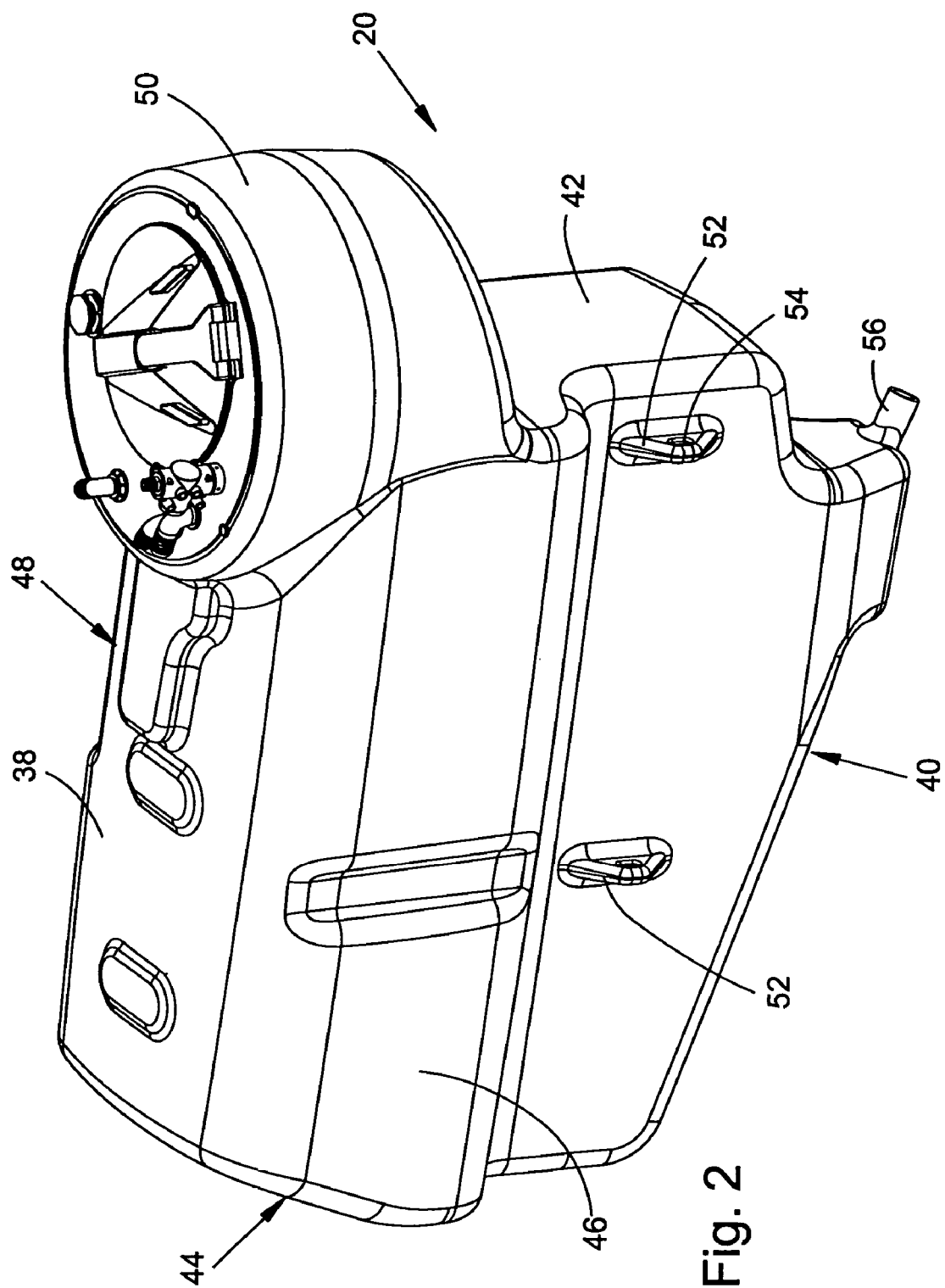
FIG. 2 shows a schematic perspective view of the tank of FIG. 1.

The tank 20 (see FIG. 2) is generally configured in a box shape and is provided with an upper side 38, an underside 40, a front side 42, a rear side 44 and sides 46, 48. A fill region 50 in the shape of a cylinder is arranged in the forward region of the tank 20 and extends upward and to the front perpendicular to the upper side of the tank. The fill region partially rises above the front side 42 and the upper side 38 of the tank 20. Brackets 52 extending perpendicular to the sides 46, 48 include bores 54. The brackets 52 are used to mount the tank 20 to the frame 12. Furthermore, the tank 20 is provided with an outlet opening 56 on the underside 40.

Figure 3:
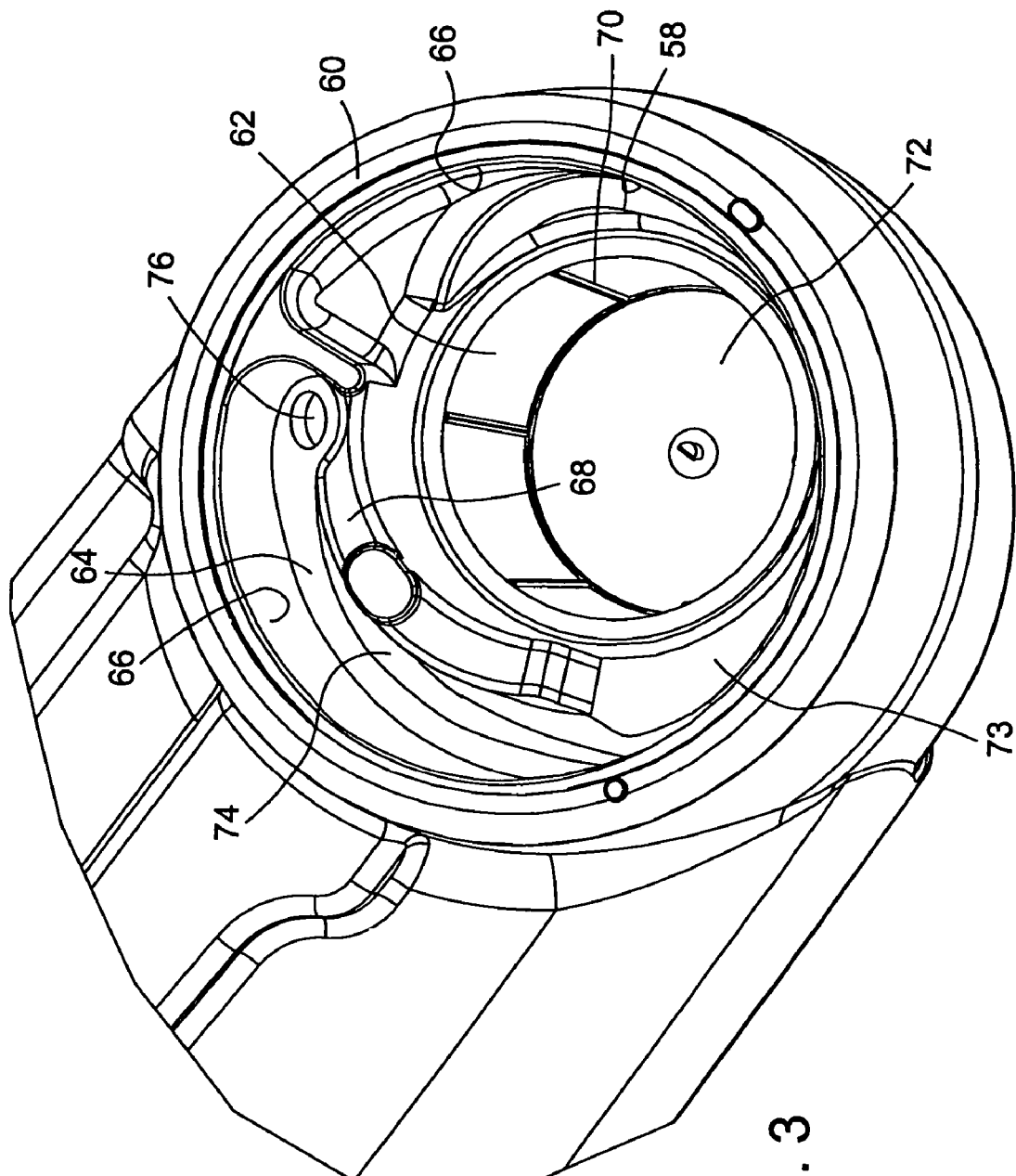
FIG. 3 shows an enlarged view of the tank of FIG. 2 with an open fill region.

The fill region 50 of the tank 20 is provided with an opening 58 arranged on the tank 20 (see FIG. 3). The opening 58 is provided with a circular rim 60. Starting from the rim 60, the fill region 50 includes a first partial region 62 and a second partial region 64, where the partial regions 62, 64 are configured as basins or pans. The partial regions 62, 64 are bordered in part by a circular wall 66 of the cylindrical fill region 50 and in part by a separating wall 68. The separating wall 68 extends in the shape of an arch transversely through the fill region 50 so that the first partial region 62 is generally shaped as a circle or an oval and the second partial region 64 is generally sickle-shaped. The separating wall 68 shields the first partial region 62 at the side with respect to the second partial region 64. The first partial region 62 is provided with an outflow opening 72 equipped with a sieve 70 in the direction of the underside 40 of the tank 20. The outflow opening essentially occupies the entire bottom of the first partial region 62. Moreover the first partial region 62 is provided with a recess 73 arranged between the outflow opening 72 at the side and the wall 66. The second partial region 64 is provided with a bottom 74 that is equipped with an outflow opening 76.

Figure 4:
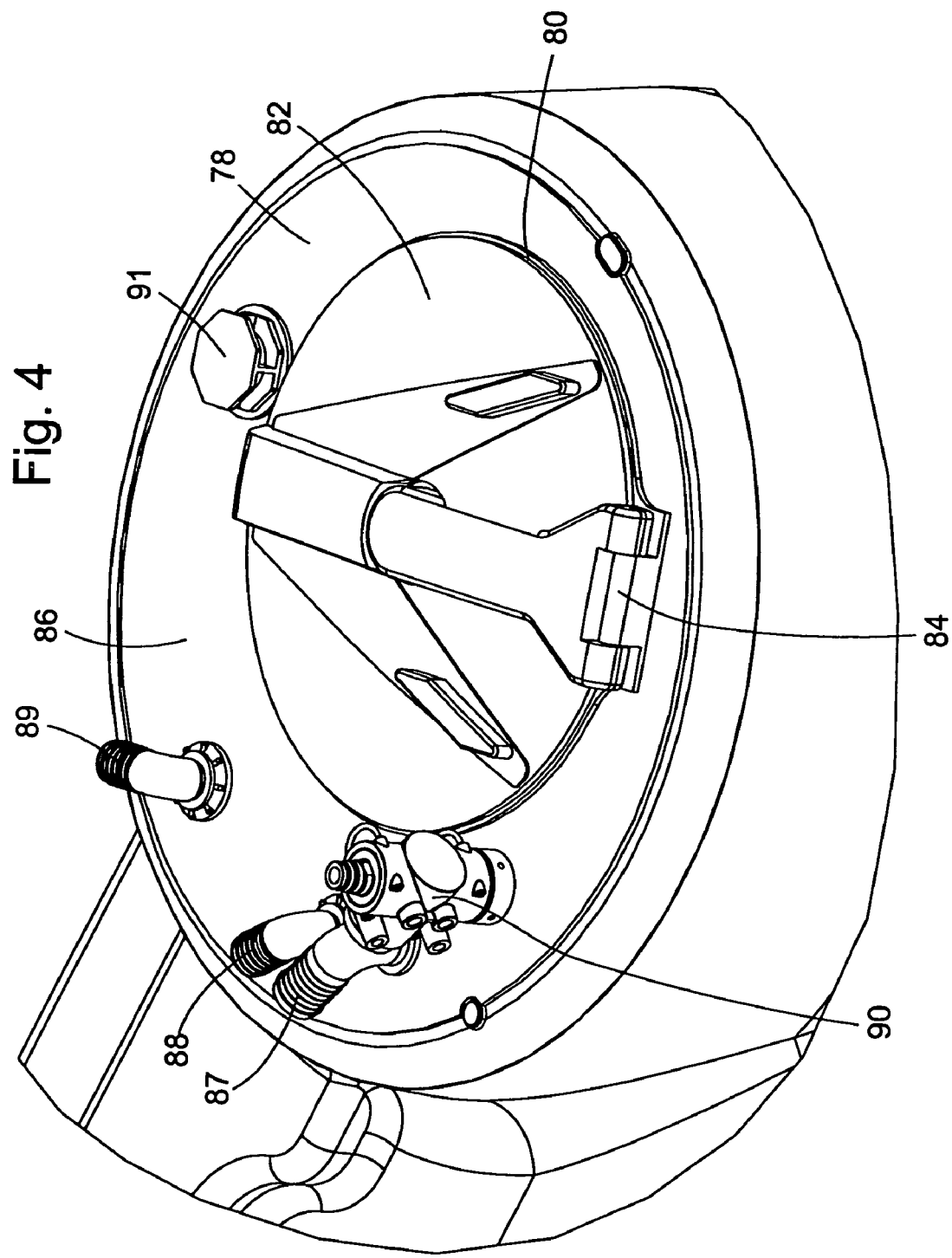
FIG. 4 shows an enlarged view of the tank of FIG. 2 with the closed fill region.

The tank 20 is also provided with a first closure 78 as is shown in FIG. 4. The first closure 78 is generally configured as a circular plate and covers the entire opening 58 of the fill region 50 completely or comes into firm contact with the rim 60 formed at the opening 58. The first closure 78 is preferably engaged by means of a screw thread with the rim 60 of the fill region 50. For this purpose bores, not shown, distributed around the circumference are provided at the edge of the first closure 78 that are aligned with threaded bores, not shown, arranged correspondingly at the rim 60. A connection of the first closure 78 that can be released is established with the tank 20 by means of threaded pins (not shown). The first closure 78 is provided with a circular opening 80 (not visible in the drawing) that is covered by a correspondingly configured circular second closure 82. The second closure 82 is configured as a folding cover and is connected with the first closure 78 at the opening 80 by a hinge 84. The opening 80 or the second closure 82 are arranged eccentrically to the first closure 78 so that the first closure 78 represents a circular ring with an eccentric interior circumference. Thereby a uniformly expanding connecting region 86 is developed at the first closure 78.

Several connections 87, 88, 89, 90, 91 are provided on the connecting region 86, that lead along an underside of the first closure 78 or into the interior of the fill region 50. The opening 80 is arranged above the first partial region 62 (see FIG. 3) and opens a region, that corresponds essentially only to the size of the outflow opening 72, so that the remaining part of the fill region 50 is completely covered by the first closure 78. Thereby the second partial region 64 is also completely covered by the first closure 78. The part of the partial region 62 freed by the opening 80 is covered by the second closure 82. The connections 87, 88, 89, 90, 91 can be arranged on the connecting region 86 in such a way that they lead either into the first partial region 62 or into the second partial region 64. It is also conceivable that a connection 87, 88, 89, 90, 91 be arranged in such a way that it leads into the first partial region as well as into the second partial region 62, 64. In the embodiment shown the connections 87, 88, 89 lead into the second partial region 64 and the connections 90, 91 lead into the first partial region 62.

The connections 87, 88, 89 are connected, for example, to return lines (not shown) that provide circulation of the fluid to be sprayed so that no deposits can develop in the spray system. The connection 90 is used to wash-in material to be sprayed that is filtered by the sieve 70 and is washed-in into the interior of the tank 20 by a carrier fluid, for example, water. Thereby the carrier fluid with the material to be sprayed is conducted through the connection 90 into the recess 73 and settled by the shape of the recess 73 and from there conducted into the sieve 70. Here it is possible to observe the washing-in process by opening the second closure 82, without the need for interrupting the circulation process. Moreover, an operator is reliably protected against any splashing fluid that could reach from the connections 87, 88, 89 in the second partial region 64 by the connecting region 86 of the first closure 78 or by the part of the first closure 78 surrounding the opening 80, and by the separating wall 68. The connection 91 is used to ventilate the tank 20.

In the connecting region 86 further connections 87, 88, 89, 90, 91 can also be provided at the first closure 78 that lead in a corresponding manner into the partial regions 62, 64. As a result of the configuration of the tank 20 described above, it is possible in a particularly simple way to arrange the connections 87, 88, 89, 90, 91 at the tank 20. In particular, the connections 87, 88, 89, 90, 91 can be sealed simply and reliably since they are accessible from both sides. An arrangement of the connections 87, 88, 89, 90, 91 directly at the tank 20, as is the usual practice in the state of the art, is frequently found to be problematical, particularly with respect to the sealing against leakages. Since the connections 87, 88, 89, 90, 91 as well as further connection 87, 88, 89, 90, 91 can be arranged at the first closure 78, the cost of manufacturing of the tank 20 can be reduced where components of the tank welded to each other or assembled by adhesive as well as the closures 78, 82 are preferably manufactured of plastic, particularly using the injection molding process. Manufacture using individual formed sheet metal parts that are subsequently welded to each other is also possible.

Figure 5:
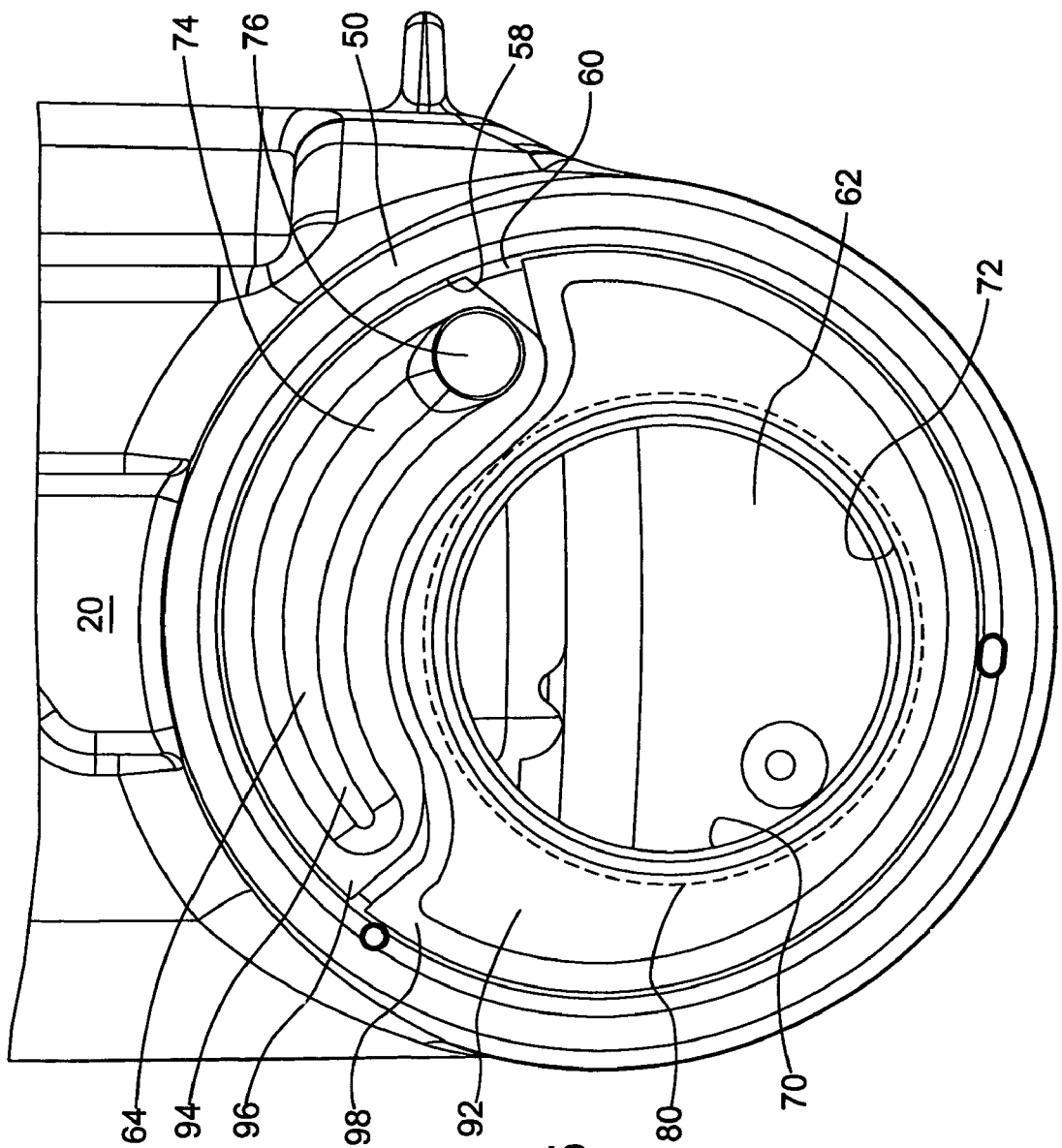
FIG. 5 shows a plan view of an open fill region in an alternative embodiment.

FIG. 5 shows an alternative embodiment of the invention. Here the first partial region 62 and the second partial region 64 are configured as first and second basin-shaped or pan-shaped insertion element 92, 94. The insertion elements 92, 94 are configured in the same form as the basin-shaped or pan-shaped partial regions 62, 64 of FIG. 3. Corresponding to the first partial region 62 of FIG. 3, the first insertion element 92 is provided with a bottom 74 and an outflow opening 76. Corresponding to the second partial region 64 of FIG. 3, the second insertion element 94 is provided with a sieve 70 and an outflow opening 72. Moreover on the insertion elements 92, 94 a projecting rim 96 and 98 is provided with which the insertion elements 92 and 94 come into contact with the rim 60 developed on the fill region 50 and where the rims 96, 98 conformed to each other in such a way that the rim 96 lies upon the other rim 98. Following this, the insertion elements 92, 94 are clamped between the first closure 78 and the rim 60 or are assembled with the first closure 78 by means of a screw thread. The advantage of insertion elements 92, 94 of this type lies in the fact that on the one hand the manufacturing process of the tank 20 can be considerably simplified since a costly configuration of the partial regions 62, 63 in the fill region 50 can be omitted. On the other hand, various configurations can be attained that result from insertion elements 92, 94 that are variable in shape and size.

Although the invention had been described in terms of only two embodiments, anyone skilled in the art will perceive many varied alternatives, modifications and variations in the light of the foregoing description, all of which fall under the present invention. Therefore, having described the preferred embodiment, it will become apparent that various modifications can be made without departing from the scope of the invention as defined in the accompanying claims.

The invention claimed is:

1. Tank for an agricultural field sprayer including a fill region located on the tank and a first closure closing the fill region, wherein the first closure includes an opening, the opening including a second closure, wherein the fill region includes a first partial region accessible from the opening and at least one material-receiving second partial region, a separating wall shielding the second partial region from at least one of the following: the opening and the first partial region, wherein at least one of the first and second partial regions includes an outflow opening having a filter, and wherein the filter is located adjacent the separating wall, the filter accessible from the second closure when the second closure is opened, and the separating wall preventing splashing of material from second partial region into the first partial region as the filter is accessed from the second closure, wherein at least one of the first and second partial regions comprises a pan, wherein the filter is in fluid communication with the opening and the second partial region for filtering fluid passing through the opening and fluid passing through the second partial region.

2. Tank according to claim 1 wherein at least one of the first and second partial regions comprises an insertion element insertable into the fill region and connectible with at least one of the following: the tank and the first closure.

3. Agricultural field sprayer tank including a tank fill region, a first closure closing the fill region and having a line connection, wherein the first closure includes an opening, the opening including a second closure, wherein the fill region includes a first region accessible from the opening and at least one second region shielded from at least one of the following: the opening and the first region, wherein at least one of the first and second partial regions comprises a basin for capturing fluid; and wherein the first region is generally circular in configuration and the second region is generally sickle-shaped.

4. The agricultural field sprayer tank according to claim 3 further including at least one separating wall located in the fill region and separating the first region from the second region.

5. The agricultural field sprayer tank according to claim 3 including at least one connector, wherein the line connection and the connector are spaced around the first closure.

6. The agricultural field sprayer tank according to claim 5 wherein the first closure includes a generally circular portion and wherein the connection and the connector are located in an outer portion of the circular portion.

7. The agricultural field sprayer tank according to claim 3 wherein at least one of the first and second closures comprises a folding cover.

\* \* \* \* \*